(12) United States Patent
Sennhenn et al.

(10) Patent No.: US 8,448,505 B2
(45) Date of Patent: May 28, 2013

(54) TEST BENCH HAVING TEMPERATURE-CONTROLLED COOLING BLOWER

(75) Inventors: Herbert Sennhenn, Messel (DE); Stefan Hüttel, Hanau (DE)

(73) Assignee: Horiba Europe GmbH (DE)

( * ) Notice: Subject to any disclaimer, the term of this patent is extended or adjusted under 35 U.S.C. 154(b) by 0 days.

(21) Appl. No.: 13/303,726

(22) Filed: Nov. 23, 2011

(65) Prior Publication Data
US 2012/0103079 A1 May 3, 2012

Related U.S. Application Data

(63) Continuation of application No. PCT/EP2010/002794, filed on May 6, 2010.

(30) Foreign Application Priority Data

May 26, 2009 (DE) .......................... 10 2009 022 675

(51) Int. Cl.
*G01M 15/02* (2006.01)
(52) U.S. Cl.
USPC ........................................................ 73/116.05
(58) Field of Classification Search
USPC ........................................................ 73/116.05
See application file for complete search history.

(56) References Cited

U.S. PATENT DOCUMENTS

| | | | |
|---|---|---|---|
| 4,669,318 A * | 6/1987 | Angstrom | 73/862.09 |
| 4,914,329 A | 4/1990 | Ottersbach | |
| 6,023,890 A * | 2/2000 | Zenobi | 52/64 |
| 6,329,732 B1 | 12/2001 | Straley | |
| 6,882,068 B2 * | 4/2005 | Weeber et al. | 310/59 |
| 7,367,229 B2 * | 5/2008 | Engstrom | 73/168 |
| 7,743,650 B2 * | 6/2010 | Engstrom | 73/114.68 |
| 7,946,812 B2 * | 5/2011 | Lambolez | 415/213.1 |
| 8,061,893 B2 * | 11/2011 | Su et al. | 374/153 |
| 8,299,663 B2 * | 10/2012 | Eriksen et al. | 310/64 |
| 2004/0066099 A1 | 4/2004 | Weeber et al. | |
| 2008/0150376 A1 | 6/2008 | Isoda et al. | |
| 2008/0215207 A1 | 9/2008 | Heinze | |

FOREIGN PATENT DOCUMENTS

| | | |
|---|---|---|
| DE | 69023313 | 5/1991 |
| DE | 19742627 | 4/1998 |
| DE | 10130982 | 1/2003 |
| FR | 2894091 | 6/2007 |
| JP | 2003322182 | 11/2003 |
| JP | 2005245085 | 9/2005 |
| JP | 2006023244 | 1/2006 |
| JP | 2007116792 | 5/2007 |

* cited by examiner

*Primary Examiner* — Freddie Kirkland, III
(74) *Attorney, Agent, or Firm* — Mayback & Hoffman, P.A.; Gregory L. Mayback

(57) ABSTRACT

A test bench encompasses a load device and a blower device for cooling the load device. With the help of one or more temperature sensors, it is possible to identify the temperature in or on the load device and to adjust the speed of a blower motor of the blower device accordingly. For instance, provision is made for changing the blower speed in a predetermined range linearly with the temperature change in the load device. In the event that one of the temperature sensors determines that a predetermined limit value is exceeded, the blower is set to maximum speed. In response to the exceeding of a further, higher temperature limit value, the load device is turned off.

21 Claims, 4 Drawing Sheets

TEST BENCH HAVING TEMPERATURE-CONTROLLED COOLING BLOWER

CROSS-REFERENCE TO RELATED APPLICATIONS

This is a continuing application, under 35 U.S.C. §120, of copending international application No. PCT/EP2010/002794, filed May 6, 2010, which designated the United States and was not published in English; this application also claims the priority, under 35 U.S.C. §119, of German patent application No. DE 10 2009 022 675.3, filed May 26, 2009; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention relates to a test bench for testing a test specimen having a temperature-controlled cooling blower and a test bench operating procedure.

BACKGROUND OF THE INVENTION

Such test benches are known, e.g., as engine or transmission test benches and support the research and development with the help of e.g., functional tests, endurance trials for the mechanical load test, as well as consumption, exhaust gas, noise, or climate examinations. The engine test benches hereby simulate the operation of the engine in a complete vehicle under different environmental or application conditions. In the test bench, the test specimen can be coupled to a load device, e.g., an asynchronous machine, a permanent magnet engine, a hydraulic dynamometer, or an eddy-current brake. The load device simulates the load, against which the engine must operate in real operation. Electric motors, which are used as load device, are often also referred to as dynamometers.

During operation, such dynamometers require a high-capacity cooling system to avoid overheating. It is important to note, thereby, that the dynamometers most completely accommodate and remove the power supplied by the test specimen.

A number of cooling methods are known, in the case of which provision is made on the primary side for fluid media, such as water or oil, and on the secondary side for air. Air-cooled dynamometers have the advantage that an expensive and complex fluid supply and processing is not necessary. However, the extremely high noise level, which is caused by the cooling blower, is disadvantageous in the case of the air-cooling.

Typically, such cooling blowers always run at full capacity to ensure a sufficient cooling of the dynamometer for every operating state and maximally specified air intake temperature. The noise level developing thereby can make work in the vicinity of the test bench more difficult. In addition, energy is wasted when the cooling blower operates at full capacity, even though a smaller cooling capacity would also be sufficient in the case of certain testing states.

A test bench is disclosed in Japanese Patent 2006-023244 to Kazuhisa, in which a dynamometer is cooled by a cooling blower, wherein the speed of the blower motor is changed as a function of the current, which is supplied to the dynamometer. However, due to the fact that the speed of the test specimen and, thus, also the speed or the load of the dynamometer, respectively, often varies during a test cycle, the current supplied to the dynamometer must inevitably change just as often, which, in turn, leads to changing blower speeds. The whistling noises of the blower motor resulting from this are also perceived by the test bench personnel as being unpleasant; in addition, the durability of the fan is reduced by the constant accelerating.

A load device, which can be cooled by a blower device, is disclosed in French Patent 2894091 A1 to Telma. The blower device is turned on when a temperature sensor, which is disposed in the inlet area of the coolant on the load device, detects an exceeding of a limit temperature.

The invention is based on the object of specifying a test bench, in which the above-described disadvantages of the state of the art can be avoided.

SUMMARY OF THE INVENTION

The invention provides a test bench having a temperature-controlled cooling blower and a test bench operating procedure that overcome the hereinafore-mentioned disadvantages of the heretofore-known devices and methods of this general type.

A test bench for testing a test specimen encompasses a load device comprising a load shaft, which is supported by two support devices, which are spaced apart from one another, and which can be connected to the test specimen, as well as comprising a stator and a rotor, which is disposed on the load shaft and which can be rotated in the stator. In addition, provision is made for a blower device for cooling the load device, comprising a blower motor and a speed control device for changing the speed of the blower motor, wherein the blower device encompasses a blower motor control device and the blower motor control device encompasses a first temperature sensor, which is arranged in a stator winding of the stator and which serves to generate a measuring signal, which is substantially linear to the measured temperature, e.g. The blower motor control device furthermore encompasses a control unit for carrying out the following control measure: continuous actuation of the speed control device of the blower device as a function of the measuring signal of the first temperature sensor and based on a control provision in the form of a direct allocation of the speed of the blower motor and of the temperature measured by the first temperature sensor.

The first temperature sensor, which continuously measures the temperature in the stator winding, is, thus, provided in the stator winding. The speed of the blower motor is adjusted based upon the corresponding measuring signal. From this, when the load device draws a lot of current in a given test procedure and heats up accordingly, this heating is detected directly in the stator winding by the first temperature sensor. This first temperature sensor supplies the measuring signal to the control unit, which then increases the speed of the blower motor to obtain a higher throughput of cooling air through the load device. In so doing, an unacceptable heating of the load device is counteracted.

Then, when the temperature decreases again in the stator winding, the first temperature sensor also notices this, whereupon the control unit can tower the speed of the blower motor again.

Depending on the design of the cooling blower, provision can also be made for corresponding dead time elements or delay elements, so that not every slight temperature change in the stator winding immediately also leads to a change of the blower speed. Only when a predetermined time has lapsed without a decrease of the load and, thus, of the temperature, the increase (or corresponding reduction) of the blower speed can be effected.

Likewise, it is also possible to provide, e.g., for a plurality of staggered limit or threshold values, respectively, upon the exceeding or falling short of which the blower speed is increased or decreased, respectively. In such a case, the blower speed does not follow the temperature linearly, but gradually. This process can be supported by a hysteresis, so as to prevent that the speed change is not carried out in time intervals that are too short.

Instead of a linear context between the temperature change and the blower speed, it may also be sensible to choose a progressive or degressive context. This also depends on the respective conditions in the test bench and the resulting cooling possibilities.

The blower motor control device can, furthermore, encompass a second and a third temperature sensor, which are disposed respectively in one of the support devices for the support of the load shaft. The control unit can be configured accordingly for carrying out the following control measures:
  actuating the speed control device of the blower device for adjusting a maximum speed of the blower motor when the second and/or the third temperature sensor identifies an exceeding of a support warning limit value, which is provided for the respective support device; and
  turning off the load device when the second and/or the third temperature sensor identifies an exceeding of a support alarm limit value, which is provided for the respective support device, wherein the support alarm limit value is greater than the support warning limit value.

In this embodiment, provision is accordingly made for two further temperature sensors, which respectively monitor the temperature in or on the supports of the load shaft provided in the load device. When one of the two temperature sensors determines an exceeding of a first threshold value (support warning threshold value), a corresponding signal is evaluated by the control unit, which then effects an increase of the speed of the blower motor to a predetermined or technical maximum value. With this, the cooling blower provides a maximum cooling power in this operating state for cooling the entire load device and, thus, also the support devices.

In the event that the temperature in the supports increases further, however, one of the two temperature sensors, that is, the second or the third temperature sensor, can identify an exceeding of the predetermined support alarm limit value. The control unit then initiates corresponding measures to turn off the load device and to prevent damage to the load device or to the entire test bench. The exceeding of the support alarm limit value is evidence for a malfunction in the test bench.

The temperature sensors should be disposed in or on the two support devices such that they can determine a temperature change in the supports as reliably as possible.

In the case of an alternative, the blower motor control device encompasses at least a fourth and a fifth temperature sensor, which are disposed in the stator winding and which serve as limit value sensors. The control unit is configured for carrying out the following control measures:
  actuating the speed control device of the blower device for adjusting a maximum speed of the blower motor when the fourth temperature sensor identifies an exceeding of a stator warning limit value, which is provided for the temperature of the stator winding; and
  turning off the load device when the fifth temperature sensor identifies an exceeding of a stator alarm limit value, which is provided for the temperature of the stator winding, wherein the stator alarm limit value is greater than the stator warning limit value.

Accordingly, further temperature sensors, namely at least the fourth and the fifth temperature sensor, are provided in the stator winding as limit value sensors in addition to the abovementioned first temperature sensor in the case of this alternative. One of the temperature sensors (the fourth) is configured to identify an exceeding of the stator warning limit value immediately. This warning limit value is configured to have the load device cooled with a maximum cooling power in response to the exceeding thereof. Accordingly, the speed of the blower motor is adjusted to the highest possible value.

The other temperature sensor (the fifth) detects an exceeding of the stator alarm limit value, which leads to a turn-off of the load device to prevent damage to the load device or to the test bench.

It is noted that the terms "fourth" and "fifth" temperature sensor have been chosen randomly not for any particular configuration and are merely labels. What is significant for these two sensors is that one of these two temperature sensors is configured in view of monitoring the stator warning limit value, while the other temperature sensor monitors an exceeding of the stator alarm limit value.

The fourth and the fifth temperature sensors can be provided as an alternative or in addition to the above-described second and third temperature sensors. Accordingly, the nomenclature "first temperature sensor", "second temperature sensor", etc, only serves the purpose of providing the temperature sensors in each case with an unambiguous name. A hierarchy, however, is not to be determined through this. The test bench can easily be equipped with a first, a fourth, and a fifth temperature sensor, while provision is not made for a second and a third temperature sensor. These terms thus also do not serve to enumerate the temperature sensors.

The load device can a dynamometer or can encompass a dynamometer, respectively, as was already described above as state of the art.

The first, the second, and/or the third temperature sensors can encompass respectively a platinum temperature sensor, in particular, a Pt100 temperature sensor. PT100 sensors are temperature sensors that are based on the resistance change of platinum under the influence of temperature. They are robust and are characterized by having high accuracy. The resistance curves of such sensors are approximately linear.

The fourth and/or the fifth temperature sensors can encompass respectively a PTC temperature sensor comprising a non-linear resistance curve, in particular, a PTC triple temperature sensor. PTC triple sensors are standardized in DIN 44082, e.g., and serve to protect electrical machines against thermal overload. PTC triple sensors identify, in particular, exceeding of a preset limit value, in response to which the resistance in the measuring sensor changes intensely.

In addition to the fourth and the fifth temperature sensors, provision can be made for at least one further temperature sensor in the stator winding. This means that further temperature sensors can also be disposed in the stator winding in addition to the fourth and the fifth temperature sensors, when this is sensible.

As in the case of the fourth and the fifth temperature sensor, the further temperature sensor can also encompass a PTC temperature sensor comprising a non-linear resistance curve, in particular, a PTC triple temperature sensor.

The control provision for actuating the speed control device of the blower can provide for a range comprising a linear context between the speed of the blower motor and the temperature, which is measured by the first temperature sensor. In this case, there is a direct allocation of the speed of the blower motor and the temperature measured by the first temperature sensor.

In particular, the linear context between a predefined lower temperature limit and a predefined upper temperature limit can be provided. As long as the dynamometer temperature is lower than the lower temperature limit, the blower motor rotates with a preset minimum speed. When the temperature of the dynamometer moves in the range between the lower temperature limit and the upper temperature limit, the blower speed is accordingly adapted linearly. Above the upper temperature limit, the blower speed is set to maximum speed.

The PTC temperature sensors, in particular, the PTC sensors, can be evenly distributed on the periphery of the stator winding. In so doing, the temperature of the entire stator winding can be monitored reliably.

The speed control device can encompass a frequency converter for adjusting or providing, respectively, a supply current for the blower motor. The supply current is provided, in particular, as a three-phase current.

A method for controlling the speed of the blower motor provides for the above-specified operation of the test bench.

A test bench encompasses a load device (2) and a blower device (9) for cooling the load device (2). With the help of one or a plurality of temperature sensors (15 to 19), it is possible to identify the temperature in or on the load device (2) and to adjust the speed of a blower motor (10) of the blower device (9) accordingly. For instance, provision is made for changing the blower speed in a predetermined range linearly with the temperature change in the load device (2). In the event that one of the temperature sensors determines that a predetermined limit value is exceeded, the blower is set to maximum speed. In response to the exceeding of a further, higher temperature limit value, the load device (2) is turned off.

With the foregoing and other objects in view, there is provided, in accordance with the invention, a test bench for testing a test specimen comprising a load device and a blower device. The load device comprises two support devices spaced apart from one another, a load shaft supported by the two support devices and operable to be connected to the test specimen, a stator having a stator winding, and a rotor disposed on the load shaft and operable to rotate in the stator. The blower device is operable to cool the load device and comprises a speed control device and a blower motor having a blower motor control device. The speed control device is operable to change a speed of the blower motor. The blower motor control device comprises a first temperature sensor disposed in the stator winding and is operable to generate a measuring signal and a control unit operable to carry out a control measure that actuates the speed control device as a function of the measuring signal and based upon a control provision in the form of an allocation of the speed of the blower motor and of a temperature measured by the first temperature sensor.

With the objects of the invention in view, there is also provided a method for controlling the speed of the blower motor in the blower device for cooling the load device of the test bench includes carrying out control measures with the control unit comprising continuously actuating the speed control device as a function of the measuring signal of the first temperature sensor and dependent upon a control provision that is in the form of an allocation of the speed of the blower motor and of the temperature measured by the first temperature sensor.

With the objects of the invention in view, there is also provided a method for controlling a test bench for testing a test specimen comprises providing a test bench with a load device and a blower device. The load device comprises two support devices spaced apart from one another, a load shaft supported by the two support devices and operable to be connected to the test specimen, a stator having a stator winding, and a rotor disposed on the load shaft and operable to rotate in the stator. The blower device is operable to cool the load device and comprises a speed control device and a blower motor having a blower motor control device. The speed control device is operable to change a speed of the blower motor. The blower motor control device comprises a first temperature sensor disposed in the stator winding and is operable to generate a measuring signal and a control unit. Control measures are carried out with the control unit comprising continuously actuating the speed control device as a function of the measuring signal of the first temperature sensor and dependent upon a control provision that is in the form of an allocation of the speed of the blower motor and of a temperature measured by the first temperature sensor.

In accordance with another feature of the invention, the blower motor control device comprises second and third temperature sensors respectively disposed on one of the two support devices and the control unit is operable to carry out control measures comprising actuating the speed control device to adjust a maximum speed of the blower motor when at least one of the second and third temperature sensors identifies an exceeding of a predefined support warning limit value associated with each of the two support devices and turning off the load device when at least one of the second and third temperature sensors identifies an exceeding of a predefined support alarm limit value associated with each of the two support devices, the predefined support alarm limit value being greater than the predefined support warning limit value.

In accordance with a further feature of the invention, the blower motor control device comprises at least fourth and fifth temperature sensors respectively disposed in the stator winding and are operable to serve as limit value sensors and the control unit is operable to carry out control measures comprising actuating the speed control device to adjust a maximum speed of the blower motor when the fourth temperature sensor identifies an exceeding of a predefined stator warning limit value associated with a temperature of the stator winding and turning off the load device when the fifth temperature sensor identifies an exceeding of a predefined stator alarm limit value associated with the temperature of the stator winding, the predefined stator alarm limit value being greater than the predefined stator warning limit value.

In accordance with an added feature of the invention, the load device is a dynamometer.

In accordance with an additional feature of the invention, at least one of the first, second, and third temperature sensors is a platinum temperature sensor, in particular, a Pt100 temperature sensor.

In accordance with yet another feature of the invention, at least one of the fourth and fifth temperature sensors is a PTC temperature sensor having a non-linear resistance curve, in particular, a PTC triple temperature sensor.

In accordance with yet a further feature of the invention, there is also provided at least one further temperature sensor in the stator winding in addition to the fourth and fifth temperature sensors. The further temperature sensor is a PTC temperature sensor having a non-linear resistance curve, in particular, a PTC triple temperature sensor.

In accordance with yet an added feature of the invention, the control provision for actuating the speed control device is a range comprising a linear context between the speed of the blower motor and the temperature measured by the first temperature sensor. The linear context is between a predefined lower temperature limit and a predefined upper temperature limit.

In accordance with yet an additional feature of the invention, the stator winding has a periphery and the PTC temperature sensors are evenly distributed on the periphery of the stator winding.

In accordance with a concomitant feature of the invention, the speed control device comprises a frequency converter operable to adjust a supply current for the blower motor.

Although the invention is illustrated and described herein as embodied in a test bench having a temperature-controlled cooling blower and a test bench operating procedure, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
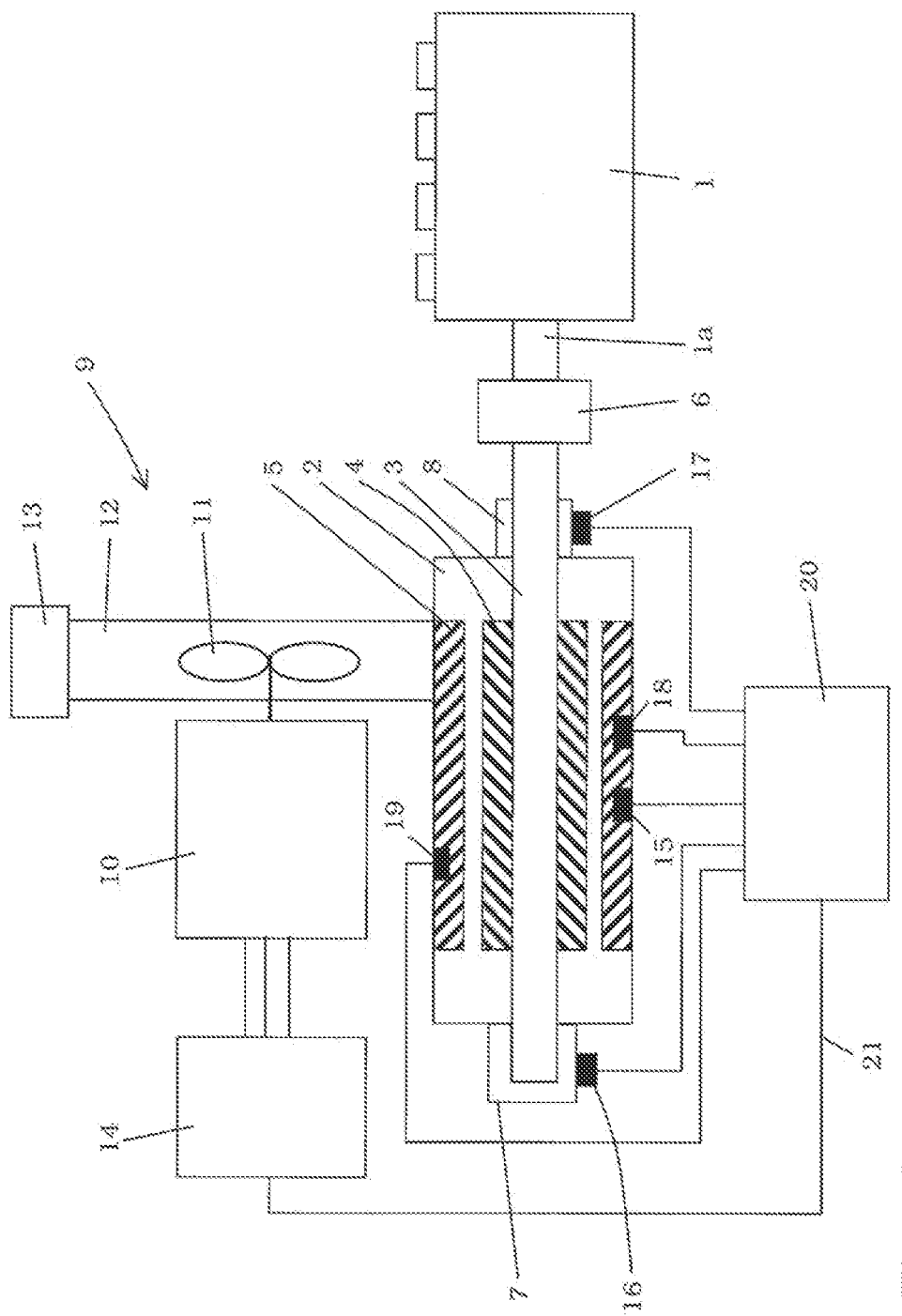
FIG. 1 is a block circuit design of an exemplary embodiment of a test bench according to the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of a schematic design of a test bench relevant for the instant invention.

The test bench serves to test a test specimen 1, which is, in this example, a combustion engine. The test specimen 1 is not a component of the test bench. Instead, only a test specimen accommodation is to be considered to be a part of the test bench, which, however, is not illustrated in detail in FIG. 1.

Coaxial to the test specimen 1, provision is made for a dynamometer 2, which serves as a load device. The test specimen 1 and the dynamometer 2 are supported on a non-illustrated base (foundation, base plate, etc.).

On principle, the dynamometer 2 corresponds to an electric motor, e.g., of an asynchronous machine or of a permanent motor and is known per se. The dynamometer 2 encompasses a load shaft 3, on which provision is made for a rotor 4, which is disposed to be rotatable in a stator 5, which is provided in the interior of the dynamometer. Among others, the stator 5 is formed by a stator winding, which is known per se. The load shaft 3 is disposed coaxially to a motor shaft 1a and is coupled to it in the known manner via a self-aligning coupling 6.

The load shaft 3 is supported in two supports 7, 8. The supports can be supported on a housing of the dynamometer 2 so that the support forces can be discharged downwards to the foundation via the housing.

A blower device 9 is disposed above the dynamometer 2. The blower device 9 serves to cool the dynamometer 2. For this purpose, the blower device 9 encompasses a blower motor 10, which drives a ventilator 11. The ventilator 11 is disposed in an air duct 12. Provision can be made at the air inlet of the air duct 12 for an air filter 13.

During operation, the ventilator 11, actuated by the blower motor 10, draws air through the air filter 13 and conveys it through the dynamometer 2. The air is, then, discharged again in a suitable manner, e.g., on the opposite side of the dynamometer 2 through cooling slots provided in the housing or through a further air duct.

The components described up to this point are substantially known and can be found in many test benches. In addition, further devices, e.g., calibrating devices for calibrating the test bench, measuring devices, exhaust discharges, media supply and discharges, air conditions, etc., are available. These devices, however, are not important for the instant invention and are, thus, not illustrated in detail.

The blower device 9 furthermore encompasses a frequency converter 14 for supplying the blower motor 10 with current and for adjusting the speed of the blower motor 10. The frequency converter 14 thus serves as speed control device and provides for a three-phase alternating current. Depending on the actuation of the frequency converter 14, the speed of the blower motor 10 can be changed.

In addition, the blower device 9 encompasses a blower motor control device, which is formed by a plurality of components.

For instance, a first temperature sensor 15, which is configured as a Pt100 sensor, for example, is disposed in the stator winding.

A second temperature sensor 16 and a third temperature sensor 17, which are also configured as Pt100 sensors, for example, and which monitor the temperature in the supports, are disposed on the two supports 7, 8.

Finally, provision is also made in the winding of the stator 5 for a fourth temperature sensor 18 and a fifth temperature sensor 19, which are configured as PTC triple sensors, for example.

The measuring signals of the temperature sensors are supplied to a common control unit 20, as is illustrated in FIG. 1 by control lines. The control unit 20 evaluates the signals of the temperature sensors and transmits corresponding control signals to the frequency converter 14 through a control line 21 to adjust the speed of the blower motor 10 in the desired manner.

The first temperature sensor 15 identifies the temperature at a certain location in the stator 5 and supplies a corresponding measuring signal through the actual temperature in the dynamometer 2 continuously or in cycles. With the help of the measuring signal, the control unit 20 calculates a corresponding control value for the frequency converter 14, so that it adjusts the desired speed of the blower motor 10.

The second temperature sensor 16 and the third temperature sensor 17 monitor the temperatures in the supports 7, 8. When a first limit value (support warning limit value) is exceeded in one of the supports 7, 8, determined by the second or third temperature sensors 16, 17 or by the control unit 20, which evaluates the measuring signals, respectively, whereupon the control unit 20 actuates the frequency converter 14 to operate the blower motor 10 with the maximally possible speed to reach the highest possible cooling power.

However, in the event that the second or the third temperature sensor 16, 17 identifies the exceeding of a further, higher limit value (support alarm limit value), the control unit 20 turns off the dynamometer 2 or even the entire test bench.

The second and the third temperature sensor 16, 17 are, thus, able to identify at least the exceeding of two limit values.

Contrary to this, the fourth and the fifth temperature sensors 18, 19 only identify the exceeding of a single limit value in each case. One of the temperature sensors 18, 19, e.g., the fourth temperature sensor 18, is thereby configured to identify the exceeding of a stator warning limit value, whereupon the control unit 20 gives a control signal to operate the blower 9 at maximum power.

The other temperature sensor, e.g., the fifth temperature sensor 19, identifies the exceeding of a higher limit value, the so-called stator alarm limit value, above which the equipment could be damaged. Accordingly, the control unit 20 turns off the equipment or at least the dynamometer 2 when the stator alarm limit value is at hand or when it is exceeded.

Figure 2:
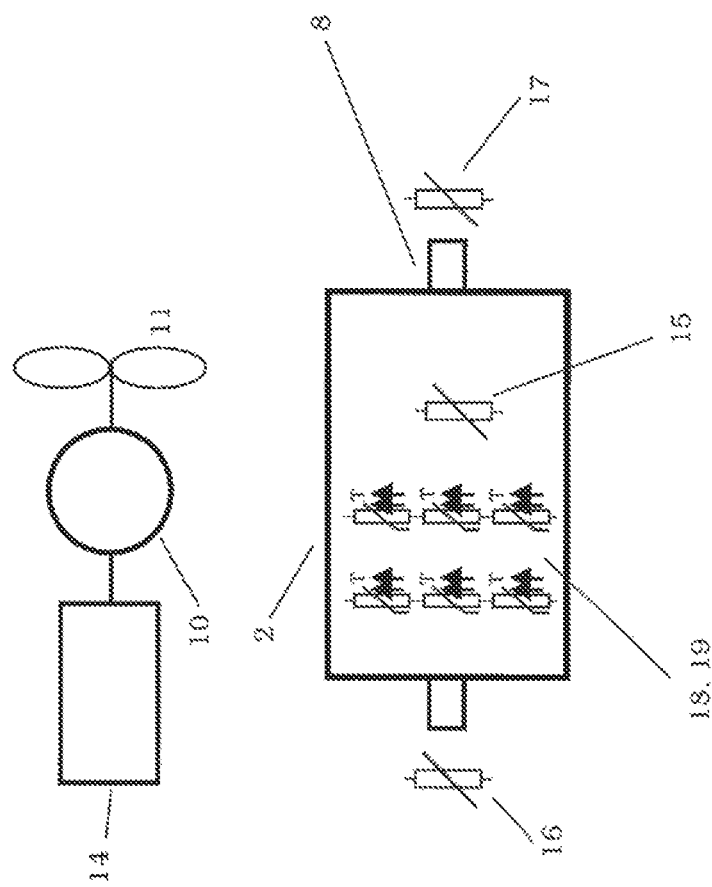
FIG. 2 is a block and schematic diagram of an exemplary embodiment for temperature monitoring of a dynamometer.

FIG. 2, once again, shows an example of a basic design of the blower control and, in particular, a different configuration of the temperature sensors.

Figure 3:
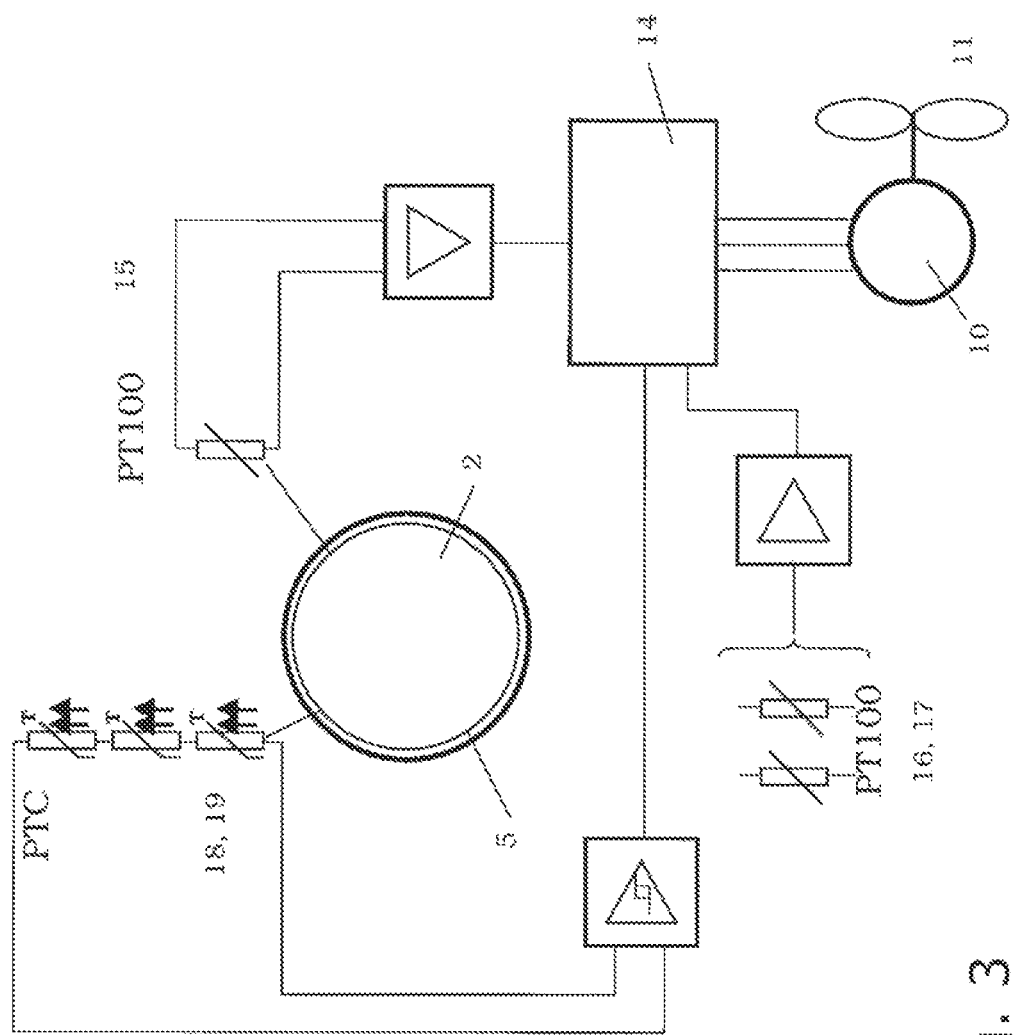
FIG. 3 is a block and schematic circuit diagram of an exemplary embodiment of blower control according to the invention.

The switching principle of the above-described blower control is clarified in FIG. 3.

Figure 4:
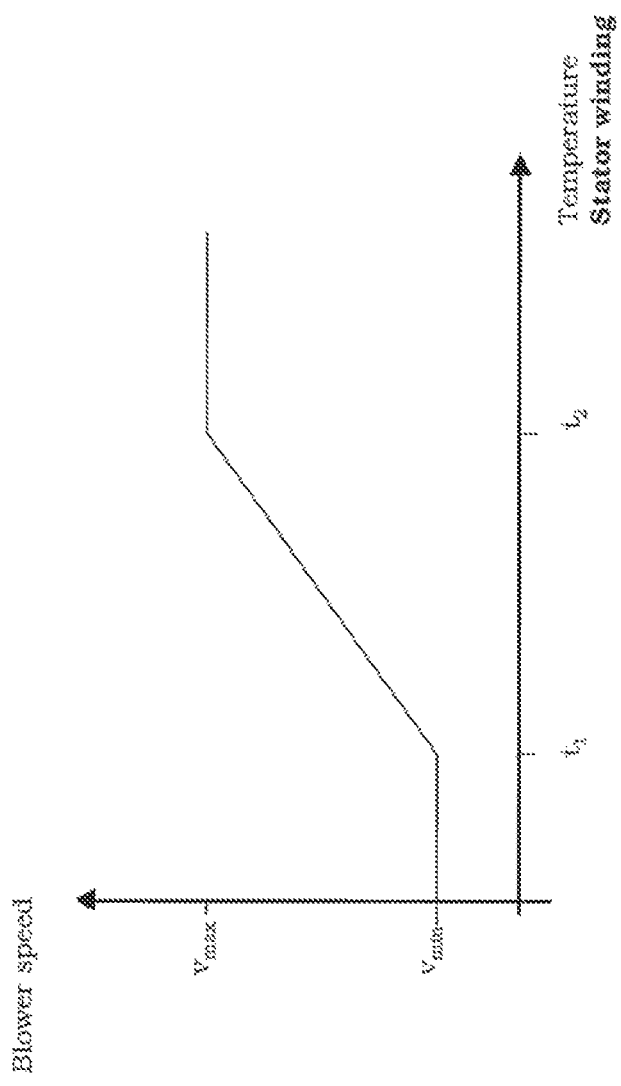
FIG. 4 is a graph illustrating a characteristic curve for controlling the blower speed according to the invention.

FIG. 4 illustrates a characteristic curve for the control of the blower speed based upon the measuring signal from the first temperature sensor 15.

Accordingly, the characteristic curve encompasses a range below a temperature $t_1$, in the case of which the blower speed is held constant at a minimum level $v_{min}$.

In a temperature range of between $t_1$ and $t_2$, the blower speed increases continuously in a linear manner until the maximum speed $v_{max}$ is reached in response to the temperature $t_2$.

The maximum speed $v_{max}$ is maintained above the temperature $t_2$.

A different characteristic curve progression can also be chosen, e.g., a progressive, a degressive, or a staged one instead of the linear context between the temperature $t_1$ and $t_2$ shown in FIG. 4.

The fourth and the fifth temperature sensor 18, 19 encompass a non-linear jump characteristic, which is provided for the determination of the exceeding of a temperature limit value. For instance, at least one of these temperature sensors can be connected to the input of a measuring amplifier with the threshold value detector. The threshold value or the limit value, respectively, is set to a predetermined temperature value, e.g., to the stator warning limit value, which is suitable for the equipment. The output of the threshold value detector triggers a digital input at the frequency converter 14. This input prompts the frequency converter 14 to operate the blower motor 10 at a maximum speed. The measuring value amplifier and the threshold value detector can be disposed in the control unit 20.

In the event that a turn-off of the dynamometer 2 is to be initiated in response to the exceeding of the support alarm limit value or of the stator alarm limit value, the control unit 20 can effect the turn-off through a non-illustrated switching unit.

The fourth and the fifth temperature sensor 18, 19 can be disposed on the periphery of the stator 5 at random, e.g., at the same distance to one another. The use of more than one PTC sensor is based on safety reasons and serves the purpose of obtaining an overview of the temperature distribution in the stator winding.

It is easily possible to also dispose more than two PTC sensors (fourth and fifth temperature sensor 18, 19) in the winding of the stator 5 to improve the temperature monitoring. In the event that only one of these PTC sensors indicates an exceeding of the respective limit value, the control unit 20 takes the provided measures and increases, in particular, the blower speed to the maximum value.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A test bench for testing a test specimen, comprising:
   a load device comprising:
      two support devices spaced apart from one another;
      a load shaft supported by the two support devices and operable to be connected to the test specimen;
      a stator having a stator winding; and
      a rotor disposed on the load shaft and operable to rotate in the stator; and
   a blower device operable to cool the load device comprising:
      a speed control device; and
      a blower motor having a blower motor control device, the speed control device being operable to change a speed of the blower motor, the blower motor control device comprising:
         a first temperature sensor disposed in the stator winding and being operable to generate a measuring signal; and
         a control unit operable to carry out a control measure that actuates the speed control device as a function of the measuring signal and based upon a control provision in the form of an allocation of the speed of the blower motor and of a temperature measured by the first temperature sensor.

2. The test bench according to claim 1, wherein:
   the blower motor control device comprises second and third temperature sensors respectively disposed on one of the two support devices; and
   the control unit is operable to carry out control measures comprising:
      actuating the speed control device to adjust a maximum speed of the blower motor when at least one of the second and third temperature sensors identifies an exceeding of a predefined support warning limit value associated with each of the two support devices; and
      turning off the load device when at least one of the second and third temperature sensors identifies an exceeding of a predefined support alarm limit value associated with each of the two support devices, the predefined support alarm limit value being greater than the predefined support warning limit value.

3. The test bench according to claim 2, wherein:
   the blower motor control device comprises at least fourth and fifth temperature sensors respectively disposed in the stator winding and are operable to serve as limit value sensors; and
   the control unit is operable to carry out control measures comprising:
      actuating the speed control device to adjust a maximum speed of the blower motor when the fourth temperature sensor identifies an exceeding of a predefined stator warning limit value associated with a temperature of the stator winding; and
      turning off the load device when the fifth temperature sensor identifies an exceeding of a predefined stator alarm limit value associated with the temperature of the stator winding, the predefined stator alarm limit value being greater than the predefined stator warning limit value.

4. The test bench according to claim 3, wherein at least one of the first, second, and third temperature sensors is a platinum temperature sensor.

5. The test bench according to claim 4, wherein the platinum temperature sensor is a Pt100 temperature sensor.

6. The test bench according to claim 1, wherein:
   the blower motor control device comprises at least fourth and fifth temperature sensors respectively disposed in the stator winding and are operable to serve as limit value sensors; and
   the control unit is operable to carry out control measures comprising:
      actuating the speed control device to adjust a maximum speed of the blower motor when the fourth temperature sensor identifies an exceeding of a predefined stator warning limit value associated with a temperature of the stator winding; and
      turning off the load device when the fifth temperature sensor identifies an exceeding of a predefined stator alarm limit value associated with the temperature of the stator winding, the predefined stator alarm limit value being greater than the predefined stator warning limit value.

7. The test bench according to claim 6, wherein at least one of the fourth and fifth temperature sensors is a PTC temperature sensor having a non-linear resistance curve.

8. The test bench according to claim 7, wherein the PTC temperature sensor is a PTC triple temperature sensor.

9. The test bench according to claim 7, wherein:
the stator winding has a periphery; and
the PTC temperature sensors are evenly distributed on the periphery of the stator winding.

10. The test bench according to claim 6, which further comprises at least one further temperature sensor in the stator winding in addition to the fourth and fifth temperature sensors.

11. The test bench according to claim 10, wherein the further temperature sensor is a PTC temperature sensor having a non-linear resistance curve.

12. The test bench according to claim 11, wherein the PTC temperature sensor is a PTC triple temperature sensor.

13. The test bench according to claim 11, wherein:
the stator winding has a periphery; and
the PTC temperature sensors are evenly distributed on the periphery of the stator winding.

14. The test bench according to claim 1, wherein the load device is a dynamometer.

15. The test bench according to claim 1, wherein the control provision for actuating the speed control device is a range comprising a linear context between the speed of the blower motor and the temperature measured by the first temperature sensor.

16. The test bench according to claim 15, wherein the linear context is between a predefined lower temperature limit and a predefined upper temperature limit.

17. The test bench according to claim 1, wherein the speed control device comprises a frequency converter operable to adjust a supply current for the blower motor.

18. A method for controlling the speed of a blower motor in a blower device for cooling a load device of a test bench according to claim 1, which comprises:
carrying out control measures with the control unit comprising continuously actuating the speed control device as a function of the measuring signal of the first temperature sensor and dependent upon a control provision that is in the form of an allocation of the speed of the blower motor and of the temperature measured by the first temperature sensor.

19. The method according to claim 18, wherein the blower motor control device comprises second and third temperature sensors respectively disposed on one of the two support devices, and which further comprises carrying out control measures with the control unit comprising:
actuating the speed control device to adjust a maximum speed of the blower motor when at least one of the second and third temperature sensors identifies an exceeding of a predefined support warning limit value associated with the each of the two support devices; and
turning off the load device when at least one of the second and third temperature sensors identifies an exceeding of a predefined support alarm limit value associated with each of the two support devices, the predefined support alarm limit value being greater than the predefined support warning limit value.

20. The method according to claim 18, wherein the blower motor control device comprises at least fourth and fifth temperature sensors respectively disposed in the stator winding and being operable to serve as limit value sensors, and which further comprises carrying out control measures with the control unit comprising:
actuating the speed control device to adjust a maximum speed of the blower motor when the fourth temperature sensor identifies an exceeding of a predefined stator warning limit value associated with a temperature of the stator winding; and
turning off the load device when the fifth temperature sensor identifies an exceeding of a predefined stator alarm limit value associated with the temperature of the stator winding, the predefined stator alarm limit value being greater than the predefined stator warning limit value.

21. A method for controlling a test bench for testing a test specimen, which comprises:
providing a test bench with:
a load device comprising:
two support devices spaced apart from one another;
a load shaft supported by the two support devices and operable to be connected to the test specimen;
a stator having a stator winding; and
a rotor disposed on the load shaft and operable to rotate in the stator; and
a blower device operable to cool the load device comprising:
a speed control device; and
a blower motor having a blower motor control device comprising:
a first temperature sensor disposed in the stator winding and being operable to generate a measuring signal; and
a control unit;
providing the speed control device to be operable to change a speed of the blower motor; and
carrying out control measures with the control unit comprising continuously actuating the speed control device as a function of the measuring signal of the first temperature sensor and dependent upon a control provision that is in the form of an allocation of the speed of the blower motor and of a temperature measured by the first temperature sensor.

* * * * *